(12) United States Patent
Betts et al.

(10) Patent No.: US 7,197,031 B2
(45) Date of Patent: Mar. 27, 2007

(54) CROSS-CONNECTION OF HIGH BANDWIDTH SIGNAL TRAFFIC ACROSS INDEPENDENT PARALLEL SHELVES

(75) Inventors: Malcolm Betts, Kanata (CA); Kim B. Roberts, Nepean (CA); Ronald J. Gagnon, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 945 days.

(21) Appl. No.: 09/992,410

(22) Filed: Nov. 26, 2001

(65) Prior Publication Data

US 2003/0099231 A1 May 29, 2003

(51) Int. Cl.
*H04Q 11/00* (2006.01)

(52) U.S. Cl. .................. 370/367; 370/387; 370/536; 370/907

(58) Field of Classification Search .............. 370/535, 370/536, 537, 542
See application file for complete search history.

(56) References Cited

U.S. PATENT DOCUMENTS

| 5,710,650 | A | 1/1998 | Dugan | 359/133 |
|---|---|---|---|---|
| 6,002,692 | A | 12/1999 | Wills | 370/465 |
| 6,411,631 | B1* | 6/2002 | Sugawara et al. | 370/465 |
| 6,693,904 | B1* | 2/2004 | McKenzie et al. | 370/387 |
| 6,822,975 | B1* | 11/2004 | Antosik et al. | 370/538 |
| 6,917,630 | B1* | 7/2005 | Russell et al. | 370/532 |
| 2002/0126712 | A1* | 9/2002 | Mueller | 370/537 |
| 2003/0002779 | A1* | 1/2003 | Bobin et al. | 385/17 |
| 2003/0189925 | A1* | 10/2003 | Wellbaum et al. | 370/372 |

\* cited by examiner

*Primary Examiner*—Hassan Kizou
*Assistant Examiner*—Anthony Sol
(74) *Attorney, Agent, or Firm*—Kent Daniels; Ogilvy Renault LLP

(57) ABSTRACT

A serial data stream is mapped through a cross-connect via two or more parallel independent shelves. The serial data stream is split into at least two sub-streams. If the lead frame of a sub-stream contains a concatenation indicator, it is replaced by a valid payload pointer, and a spilt indicator is inserted into the frame. Each of the sub-streams is then mapped through the cross-connect via a respective parallel independent shelf. Finally, the sub-streams are recombined to form an output serial data stream equivalent to the original serial data stream. If the lead frame of a sub-stream contains a split indicator, a concatenation indicator is inserted into the corresponding frame of the output serial data stream to restore the concatenation of the original serial data stream. Otherwise, a payload pointer within the lead frame is replaced by a valid payload pointer in the corresponding frame of the output data stream.

23 Claims, 4 Drawing Sheets

CROSS-CONNECTION OF HIGH BANDWIDTH SIGNAL TRAFFIC ACROSS INDEPENDENT PARALLEL SHELVES

CROSS-REFERENCE TO RELATED APPLICATIONS

This is the first application filed for the present invention.

MICROFICHE APPENDIX

Not applicable.

TECHNICAL FIELD

The present invention relates to communications network cross-connects, and in particular to cross-connection of high bandwidth signal traffic across independent parallel shelves of a cross-connect in a communications network.

BACKGROUND OF THE INVENTION

Synchronous Optical Network (SONET)/Synchronous Digital Hierarchy (SDH) protocol is widely used for physical-layer data transport. SDH is the European equivalent of the SONET standard. A reference in this document to SONET is therefore intended to refer to SDH as well as SONET.

As is well known in the art, it is highly desirable to successfully complete every request for a connection through a telecommunications network. A connection that cannot be completed successfully, for example because a mapping of the connection through a switch cannot be found, is said to be "blocked". It is also well known that Application Specific Integrated Circuits (ASICs) can be interconnected in a Clos network pattern to provide a versatile switching node (or shelf). In principle, such a Clos network may be designed to be unconditionally non-blocking by providing sufficient hardware resources. For example, a three-stage Clos-type network can be made non-blocking by providing a sufficiently large number of nodes in the center stage. In particular, a three-stage Clos network supporting P input connections into the ingress stage, and M intra-switch connections through the center stage, can be made completely non-blocking by providing that $M \geq 2P-1$. However, as the desired number of input connections increases, the number of intra-switch connections (M) through the center stage required for non-blocking performance (and the associated cost) becomes prohibitive. This imposes an economic limitation on the bandwidth capacity of a shelf.

However, as traffic volumes through communications networks increase, the bandwidth capacity of any one shelf can easily become exhausted, resulting in undesirable blocked connections. One way of addressing this problem is to increase the size of each shelf. However, this solution requires that a network service provider absorb the cost of replacing a small shelf with a new, larger capacity shelf. In view of the substantial cost of each shelf, many network service providers are reluctant to adopt this option.

An alternative solution is to augment a small shelf with one or more additional shelves (which may be of equal or greater size), to obtain the required total capacity. For example, consider a communications network in which the aggregate demand for bandwidth is four times the capacity of a shelf. An unconditionally non-blocking cross-connect can be achieved using a 4×4 matrix of shelves. A more efficient architecture can be obtained by interconnecting shelves into a CLOS network. This later approach enables an unconditionally non-blocking cross-connect using a 4×3 matrix of shelves.

A significant limitation of the above-noted techniques is the number of shelves required to obtain a non-blocking cross-connect. In particular, if the aggregate demand for bandwidth is N times the bandwidth capacity of a shelf, then a "brute force" approach requires N×N shelves, while a CLOS network requires 3×N shelves. The large number of shelves increases the size, complexity and cost of the cross-connect.

It is known to inverse multiplex traffic into two or more lower rate signals which are then transported over respective channels, and then subsequently recombined. For example, U.S. Pat. No. 6,002,692 (Wills) teaches a system in which a Synchronous Optical Cross-connect (SONET) signal (e.g., an OC-48c at a 2.488 GHz line rate) is inverse multiplexed into multiple Asynchronous Transfer Mode (ATM) cells which are then transported across a network through respective ports at a lower rate (e.g., 622 MHz). In cases where data of a single SONET frame is carried within two or more ATM cells, each of the involved cells is provided with a respective sequence number so that the cells can be placed into the correct sequence for reassembly of the original SONET frame.

The system of Wills is typical of packet-based inverse-multiplexing methods, in that it requires a significant amount of processing to separate the SONET frame into ATM cell payload; formulate ATM cell headers with assigned sequencing numbers; and then re-sequence the ATM cells prior to reassembly of the SONET frame. Such systems are not easily implemented at multiple gigabits per second line rates. Furthermore, such packet-based methods are not relevant to concatenated SONET signals, where the lower-rate signals are themselves SONET signals.

An alternative approach is to inverse multiplex a high bandwidth signal into multiple substreams, which can be transported, in parallel, at a lower line rate. U.S. Pat. No. 5,710,650 (Dugan) teaches a system in which a high data rate OC-192 signal (at a 9.953 GHz line rate) is inverse multiplexed into four lower rate OC-48 substreams (at a 2.488 GHz line rate) which are transported through respective parallel channels (wavelengths). The lower line rate within each channel provides increased dispersion tolerance, so that longer fiber spans can be used without regeneration of the signals. At a downstream network node, misalignment between the OC-48 substreams (due to the differing propagation speeds of the four wavelengths) is resolved by processing each of the OC-48 substreams in parallel to extract their respective 48 STS-1 frames (each having a 51.840 MHz line rate). These STS-1 frames are then individually buffered and processed, in parallel, to eliminate any misalignment.

A limitation of the above-noted prior art systems is that, in cases where a high bandwidth signal is split between two or more substreams, successful recovery of the original high bandwidth signal traffic requires precise alignment of the payload data being transported through each channel. Maintenance of such precise payload alignment generally requires synchronized pointer processing of each of the channels. However, synchronized pointer processing between shelves is typically not supported. This is due to various factors, including control signal (e.g. master clock signals, stuff indications etc.) propagation delays and variable phase jitter resulting from differing propagation path lengths. As a result, in order to obtain the necessary synchronization, all of the substreams must still be mapped through a single shelf, which at least partially negates much of the benefit of using multiple shelves, and increases the risk of blocked connections.

A further limitation is that, in practice, the signal traffic being mapped through the cross-connect will tend to be an arbitrary mixture of high and low bandwidth signals. In this respect, a "low bandwidth signal" may be considered to be a signal that is smaller than the slicing interval used to inverse-multiplex the traffic, while a "high bandwidth signal" is larger. Thus inverse multiplexing will necessarily split a high bandwidth signal across two or more lower rate substreams. In either case, there is no assurance that any of these signals will be of a size that is convenient, from the point of view of the inverse multiplexing operation. In the case of low bandwidth signals, this can result in allocation of cross-connect resources that remain unused (because the low bandwidth signal does not occupy the entire capacity of a substream). For high bandwidth signals, a more difficult problem arises, in that the signal must be split across two sub-streams, which must then be recombined to recover the original high bandwidth signal.

Accordingly, a highly scalable system capable of efficiently mapping an arbitrary mixture of high and low bandwidth signal traffic through a cross-connect remains highly desirable.

SUMMARY OF THE INVENTION

An object of the present invention is to provide a scalable system capable of efficiently mapping an arbitrary mixture of high and low bandwidth connections through a cross-connect.

Accordingly, an aspect of the present invention provides a method and system for mapping signal traffic through a cross-connect via two or more parallel shelves of a switch core of the cross-connect. In accordance with the invention, an input data stream is received at an input port of the cross-connect. The input data stream is split into at least two sub-streams, each of which is then mapped to a selected output port of the cross-connect via a respective shelf. Finally, an output data stream that is equivalent to the input data stream is constructed at the output port using content extracted from each sub-stream.

The input data stream may include an arbitrary mixture of high and low bandwidth signals. In some embodiments, the signals are either one of: Synchronous Optical Network (SONET) signals; and Synchronous Digital Hierarchy (SDH) signals.

In some embodiments, an overhead of each frame of the input data stream is inspected to determine whether the overhead contains a payload pointer. If a payload pointer is found, it can be stored in memory for later use.

If desired, a default value can be assigned to a predetermined set of one or more bits of each frame. This may involve writing a predetermined value to the predetermined set of bits. The predetermined set of bits may be located within the overhead of each frame, in which case they preferably comprise the SS bits of an H1 byte of the overhead of each frame, which are normally unused.

In some embodiments, a determination is made concerning whether a frame is a lead frame of a respective one of the sub-streams. If the frame is a lead frame, the frame overhead can be examined to determine whether it contains a concatenation indicator. If a concatenation indicator is found in the lead frame, it can be replaced by a valid payload pointer, and a split indicator inserted into the predetermined set of bits of the frame.

A lead frame of a sub-stream is forwarded to a next, successive, shelf of the cross-connect. All other frames are forwarded to the same shelf as the previous frame.

In order to construct the output data stream, a respective set of sequential frames is constructed for each sub-stream. Payload data from each sub-stream can then be mapped, payload aligned with each of the other sub-streams, to the respective set of frames of the output data stream. With this arrangement, a phase relationship between any one sub-stream and the output data stream (and, indeed, between the input and output data streams) can be arbitrary.

Construction of the set of sequential frames of the output data stream may include copying at least a portion of an overhead of each frame of the respective sub-stream to a corresponding frame of the output data stream. Each frame of the respective sub-stream can be examined to determine whether or not the frame contains a split indicator. If a split indicator is found, a concatenation indicator can be inserted into the overhead of the corresponding frame of the output data stream, in order to restore the original concatenation of the input data stream. On the other hand, if the frame contains a payload pointer and a split indicator is not found, then a valid payload pointer (that is, reflecting the position of the first payload byte within the frame of the output data stream) can be inserted into the overhead of that frame of the output data stream.

Mapping of payload data from each sub-stream may include buffering the payload data in an alignment buffer. A read operation for reading the buffered payload data from the alignment buffer can then be controlled such that corresponding bytes of each sub-stream are read substantially simultaneously.

In general, an input data stream (which may be either serial or parallel) is mapped through a cross-connect via two or more parallel shelves. The input data stream is split into at least two sub-streams. If the lead frame of a sub-stream contains a concatenation indicator, it is replaced by a valid payload pointer, and a split indicator is inserted into the frame. Each of the sub-streams is then mapped through the cross-connect via a respective parallel shelf. Finally, the content of each sub-stream is used to construct an output data stream that is equivalent (at least in terms of concatenation and payload data content) to the original input data stream. If the lead frame of a sub-stream contains a split indicator, a concatenation indicator is inserted into the corresponding frame of the output data stream to restore the concatenation of the input data stream. Otherwise, a payload pointer within the lead frame is replaced by a valid payload pointer in the corresponding frame of the output data stream.

With this arrangement, a set of connections having a total bandwidth of, for example, N times the capacity of a shelf, can be transported through the cross-connect using N parallel shelves. In addition, the input data stream can be composed of an arbitrary mixture of high and low bandwidth signal traffic. The input data stream is split in such a manner that the bandwidth of each sub-stream can be fully utilized (independently of the size of any signal within the input data stream), thereby eliminating inefficient allocations of physical resources of the cross-connect. Each of the sub-streams follow independent paths (and may be independently pointer processed) through the cross-connect, resulting in arbitrary phase (and payload) misalignments between each of the sub-streams. These misalignments are automatically resolved in the output port during construction of the output data stream.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
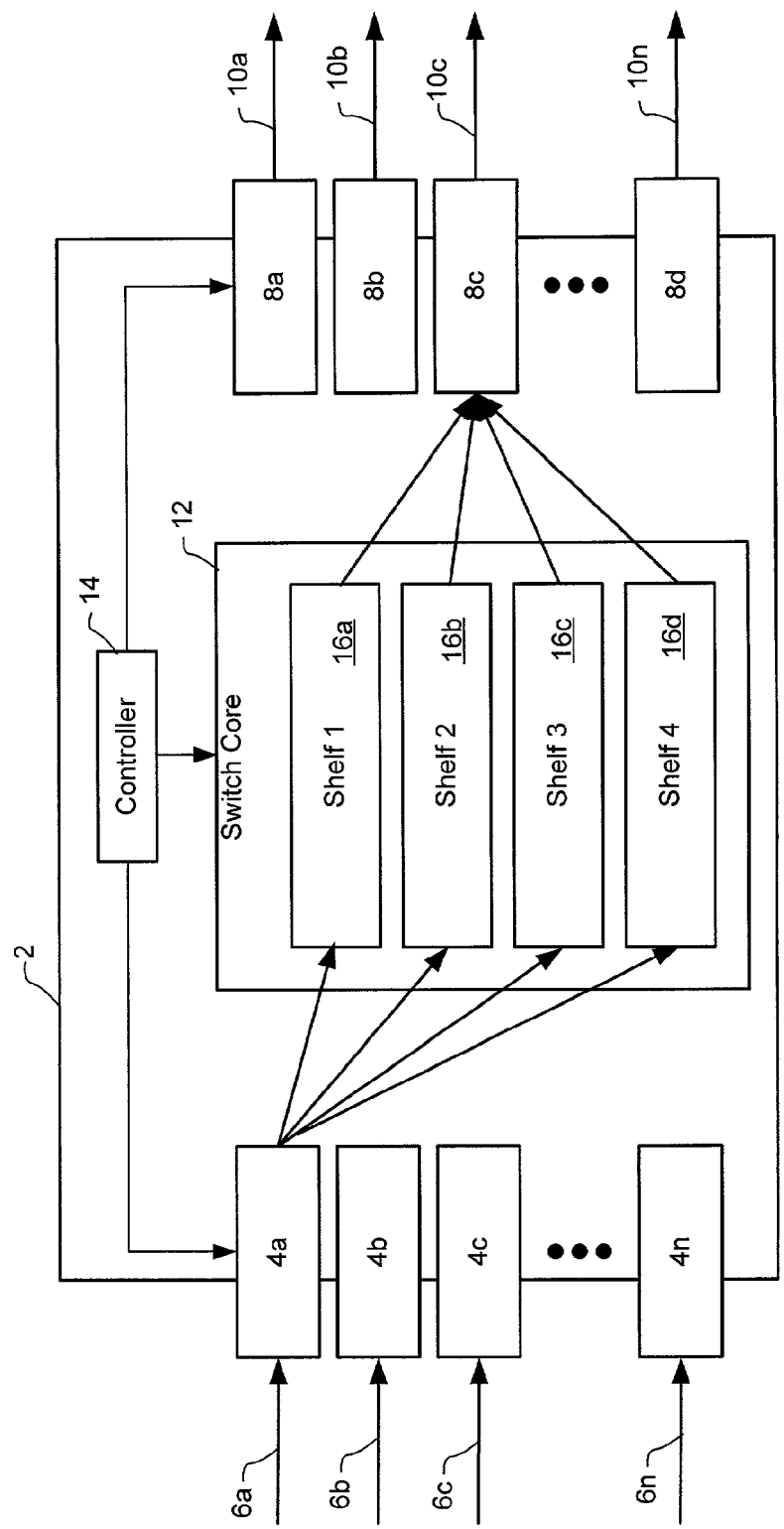
FIG. 1. is a block diagram illustrating a cross-connect in accordance with an embodiment of the present invention.

This invention provides a method and system for mapping high-bandwidth signal traffic through a cross-connect between an input port and output port via independent shelves. Each shelf of the cross-connect is independent in that respective data streams in each shelf may be subject to independent pointer processing. FIG. 1 is a schematic diagram of an optical cross-connect 2 in which the present invention may be deployed.

As shown in FIG. 1, the cross-connect 2 comprises a plurality of input ports 4 for receiving incoming traffic through respective upstream channels 6 of the network; a plurality of output ports 8 for launching outgoing traffic into respective downstream channels 10 of the network; a switch core 12 designed to map traffic received through each one of the input ports 4 to any one of the output ports 8, and a controller 14 for controlling operation of the node 2. The switch core 12 is divided into parallel shelves 16, each of which is designed to route traffic between any input port 4 and any output port 8. If desired, each shelf may implement a multi-stage CLOS switch architecture, in a manner well known in the art. In order to mitigate effects of propagation delays, each shelf implements a respective set of pointer processor state machines (not shown), which operate independently of the pointer processor state machines of adjacent shelves, as is also well known in the art.

In the illustrated embodiment, the cross-connect is provided with four shelves. However, it will be appreciated that more, or fewer shelves may be provided.

In general, mapping the inbound traffic through the cross-connect, in accordance with the present invention, involves: splitting the traffic to create a number of sub-streams; mapping each sub-stream through a respective shelf to a selected output port; and using the content of each of the sub-streams at the output port to generate output traffic that is equivalent (at least in terms of data content and concatenation) to the original inbound traffic. Each of these steps is described below with respect to FIGS. 2 through 4.

Splitting the Inbound Traffic

The purpose of this step is to inverse-multiplex signal traffic received at an input port 4 by splitting the traffic into a number of sub-streams that are distributed across the switch core. The process of splitting a received data stream is illustrated by way of an example in FIGS. 2 and 3.

Figure 2:
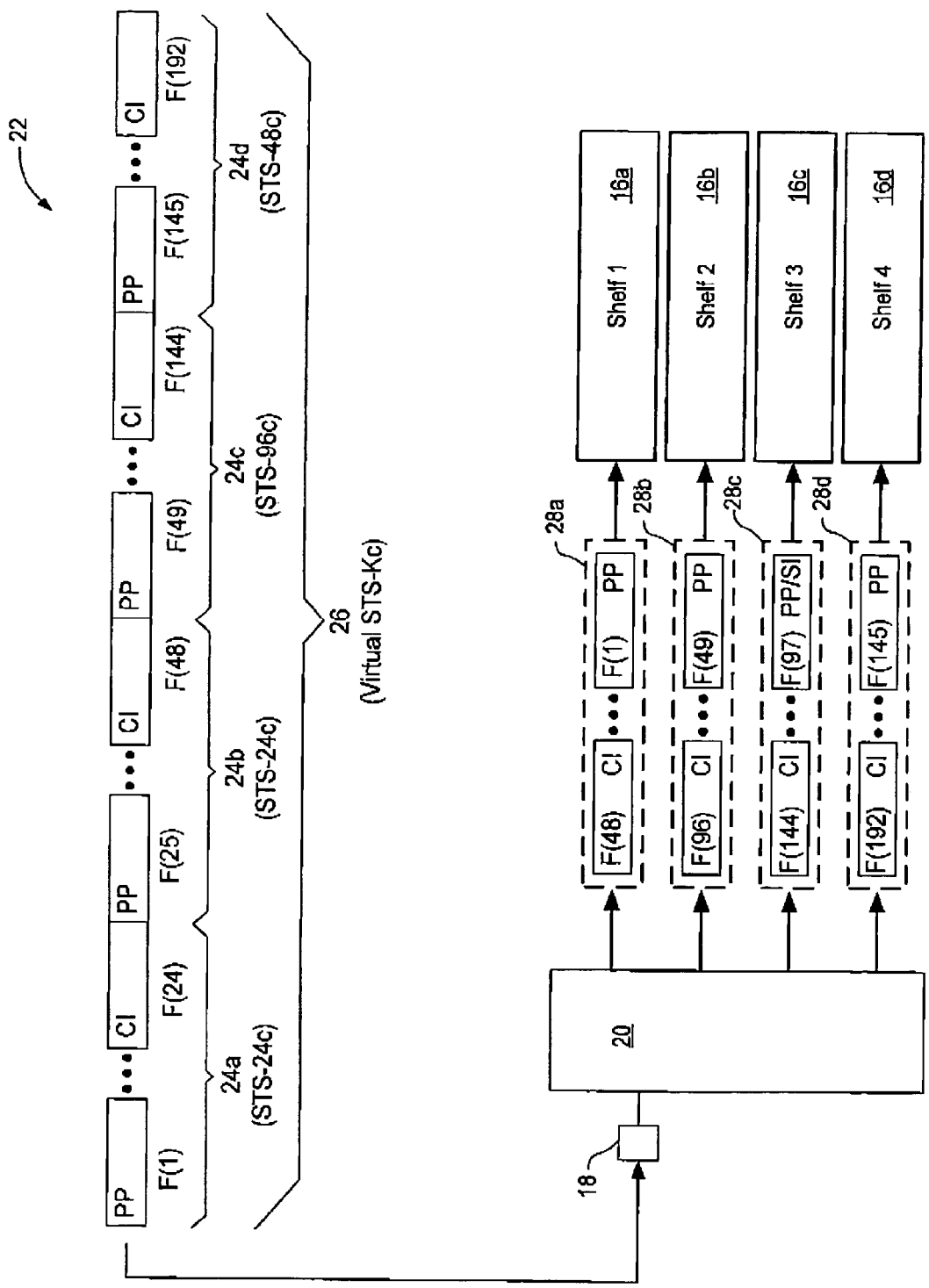
FIG. 2 is a block diagram schematically illustrating principle operations of an input port of the cross-connect illustrated in FIG. 1.

As shown in FIG. 2, the input port 4a includes at least one optical interface 18 for receiving input signal traffic from respective upstream channels 6, and a signal processor 20 for splitting the received traffic across multiple shelves 16 of the switch core 12.

In the embodiment shown in FIG. 2 the input port 4 has one optical interface 18 for the sake of simplicity in illustration. However, it will be appreciated that the input port 4 is normally provisioned with a plurality of optical interfaces. In general, the signal processor 20 may be provided as any suitable combination of hardware and/or software. At lower line rates, the use of a suitably programmed micro-processor may provide an acceptable implementation of the signal processor 20. However, at line rates exceeding multiple GHz, such a software-based signal processor 20 will likely not yield satisfactory performance. Thus at higher line rates, a hardware-based implementation of the signal processor 20, following design principles well known in the art, will normally be required.

As shown in FIG. 2, the signal processor 20 receives an input data stream 22 containing an arbitrary mix of low bandwidth signals and high bandwidth concatenated signals. The signal processor 20 is designed to split the input data stream across the multiple shelves 16 of the switch core 12.

During installation of the cross-connect 2, the following parameters are defined:

the number Q of shelves 16 to which each input port 4 can route traffic. In the illustrated embodiment, Q=4. However, this is in no way limitative of the present invention;

the number M of data frames included in each sub-stream that may be transported through each shelf 16. This parameter is generally arbitrary, and may be selected to provide a conveniently-sized sub-stream signal for routing through each shelf 16; and the shelf ordering sequence, by which successive sub-streams will be routed to respective shelves 16 of the switch core 12.

The values of M and Q are provisioned at the time of set up of the cross-connect 2. In the example shown in FIG. 2, the switch core 12 is configured with Q=4 parallel shelves 16, which are nominally identified as shelves S(1)–S(4). The value of M is normally delimited by the design of each shelf 16 in the cross-connect. For the purposes of illustration, each shelf 16 is assumed to be optimized to transport OC-48 signals, in which case the preferred value of M is 48.

The incoming data stream 22 received by the signal processor is made up of an arbitrary mix of high and low bandwidth signals 24. In the illustrated embodiment, the serial data stream is composed of two STS-24c signals 24a and 24b, an STS-96c signal 24c and an STS-48c signal 24d. However, for the purposes of the present invention, the input data stream is viewed as a virtual SONET STS-Kc signal 26 composed of (K) concatenated STS-1 frames. In general, the STS-Kc 26 may include any integer number of STS-1 frames, up to any physical limits imposed by the cross-connect 2 or the input and output ports 4 and 8, as will be explained below in more detail. However, the value of (K) is preferably set equal to Q×M, in order to ensure that the frames of the STS-Kc 26 can be evenly distributed across the shelves 16 of the cross-connect 2.

Thus, in the illustrated embodiment, the STS-Kc signal 26 is composed of K=(4×48)=192 frames, which are nominally identified as F(1)–F(192). This virtual STS-192c signal 26 is split by the signal processor 20 into Q=4 sub-streams 28a–28d, each of which includes M=48 of the K=192 STS-1 frames.

As may be appreciated, because the value of K is selected based on the number of shelves and the optimum signal size of each shelf, the relationship between K and the line rate of the incoming data stream 22 will generally not conform to the SONET standard. Furthermore, there is no requirement that the virtual STS-Kc signal encompass an integer number of signals of the input data stream. In cases, where the last frame of the virtual STS-Kc signal falls within an input data signal, the remaining portion of the involved input data signal will automatically be handled within the next virtual STS-Kc signal.

The input data stream 22 received by the input port 4 can be split across the Q shelves of the cross-connect 2 in real time as successive frames F(1)–F(192) are received by the signal processor 20. A "split location" can be defined as a location at which the virtual STS-Kc signal 26 must be split in order to form each successive sub-stream 28. This can conveniently be defined in terms of the frame number (n) such that a frame at a split location becomes the leading frame of a corresponding sub-stream 28. Thus, each split location corresponds to a frame F(n) for which the frame number n satisfies the equation:

$$n = M \times p + 1, \quad 1 \geq p \geq Q$$

In the present example, M=48, so that split locations of the virtual STS-Kc signal will correspond to the $49^{th}$, $97^{th}$ and $145^{th}$ frames. In all cases, these frames form the first frame of a sub-stream 28 forwarded to a next successive shelf 16 (in accordance with the shelf ordering sequence described above). If any of these frames contains a valid payload pointer (that is, it is the first frame of a signal 24 within the incoming data stream 22), no modifications are made in the frame overhead. Otherwise, a valid payload pointer is inserted into the frame overhead, along with a split indicator (as will be described in greater detail below). The insertion of the payload pointer ensures that the sub-stream 28 emulates a conventional STS concatenation, at least with sufficient accuracy to enable the sub-stream 28 to be successfully pointer-processed through a shelf 16 of the cross-connect 2 in a conventional manner. This enables legacy shelves to be incorporated into the cross-connect 2.

As may be appreciated, there is no requirement for synchronization between the virtual STS-Kc signal 26 (and/or its split locations) and the signals 24 within the incoming data stream 22. A split location may, or may not correspond with a leading frame of an incoming signal 24. Similarly, there is no requirement for a signal 24 within the incoming data stream 22 to fit within the STS-Kc 26. If desired, an incoming signal 24 may be larger than the STS-Kc 26. The first frame of an incoming signal 24 may lie (at any arbitrary location) within one STS-Kc 26, and its last frame may lie within a successive STS-Kc 26 (again, at any arbitrary location).

Exemplary steps in a process of splitting data stream 22 are described below with reference to FIG. 3.

When the data stream 22 is set up through the cross-connect, a pair of counters n and p (where n represents the frame number within the virtual STS-Kc signal 26, and p is an index identifying each shelf) are initialized to n=0 and p=1 respectively (step 100). At the same time, a shelf identifier (S(p)) determined by the value of p is initialized.

Upon receipt of data frame F(1), for example, (step 102), the frame overhead is processed and analyzed to validate the overhead pointers (step 104). Upon successful validation of the frame overhead, the frame is examined (step 106) to determine whether the frame overhead contains a payload pointer (PP), indicating that the frame is a first frame in an STS-N concatenation. Following standard SONET frame concatenation rules, the second through Nth frames of an STS-N concatenation within the virtual STS-Kc signal 26 will contain a concatenation indicator CI in place of the payload pointer PP. If the frame contains a valid payload pointer, the payload pointer is stored in a memory in step 108.

Regardless of whether the frame contains a valid payload pointer or a concatenation indicator, a split indicator (SI) value within the frame is set to a default value at step 110. The split indicator provides an explicit indication that a SONET signal 24 has been divided across two (or more) sub-streams, and thus enables reconstruction of that signal 24 in the output port 8 (as will be described in greater detail below) independently of the size or location of the signal 24 within the virtual STS-Kc signal 26

In general, any means of explicitly indicating that a signal 24 has been split may be used as the split indicator. The preferred possibility is to use the SS field within the H1 byte of the frame overhead. While the SS field is defined in standard SONET/SDH protocol, it is generally not used and thus its value can be altered without corrupting the frame overhead. For example, the split indicator SI can be defined as a value of binary 01 in the SS field. Because the SS field is normally unused, frames containing the split indicator can be pointer processed through a shelf using a conventional pointer processor state machine. Another possibility is to expand the frame size, and use the extra frame capacity to carry the split indicator. This latter arrangement requires modification of the pointer processor state machines in each of the shelves 16 in order to accommodate the expanded frames.

In either case, setting a default value of the split indicator (for example, writing binary "00" to the SS field) at step 110 enhances reliability during reconstruction of the data stream 22 at the output port by ensuring that every frame received at the output port 18b contains an explicit indication of whether or not it corresponds to a split location of an STS-N signal 24 that needs to be reconstructed.

After the split indicator value has been initialized (at step 110), the counter "n" is compared (at step 112) with M+1 to determine whether the frame should be forwarded to a current shelf (indicated by S(p)), or a next shelf. If n is not equal to M+1, n is incremented by one (at step 130) and the frame is routed to the current shelf (at step 132). If n=M+1, n is reset to n=1 in step 114 to indicate that the frame is at a split location, and thus is to be forwarded to the next shelf of the switch core. In step 116, the counter p is compared with Q to determine whether the last shelf is currently being used. If p is equal to Q, p is reset to p=1 (at step 118) so that the first shelf is used to convey the data frame. Otherwise, p is incremented by 1 (at step 120) so that the next successive shelf will be used. In either case, the current shelf (SHELF) is set to the identifier S(p) (at step 122), to indicate to the signal processor 20 which shelf should be used to carry the data frame.

In step 124, the frame overhead is examined to determine whether the overhead contains a concatenation indicator (CI). If not, the frame is routed to the current shelf (at step 132) without modification. The presence of a concatenation indicator means that the frame is a frame in an STS-N signal 24 within the virtual STS-Kc signal 26. Because the frame is also the first frame of the sub-stream forwarded to the current shelf (as determined at step 112 above), a "split indicator" SI is inserted into the frame. The payload pointer (PP) belonging to the first frame in the STS-N signal 24, which was previously stored in memory at step 108, is then inserted (at step 128) into the frame overhead to replace the concatenation indicator (CI). The frame is then forwarded to the current shelf (at 132). Steps 102–132 are repeated for each frame of the serial data stream 22.

Figure 3:
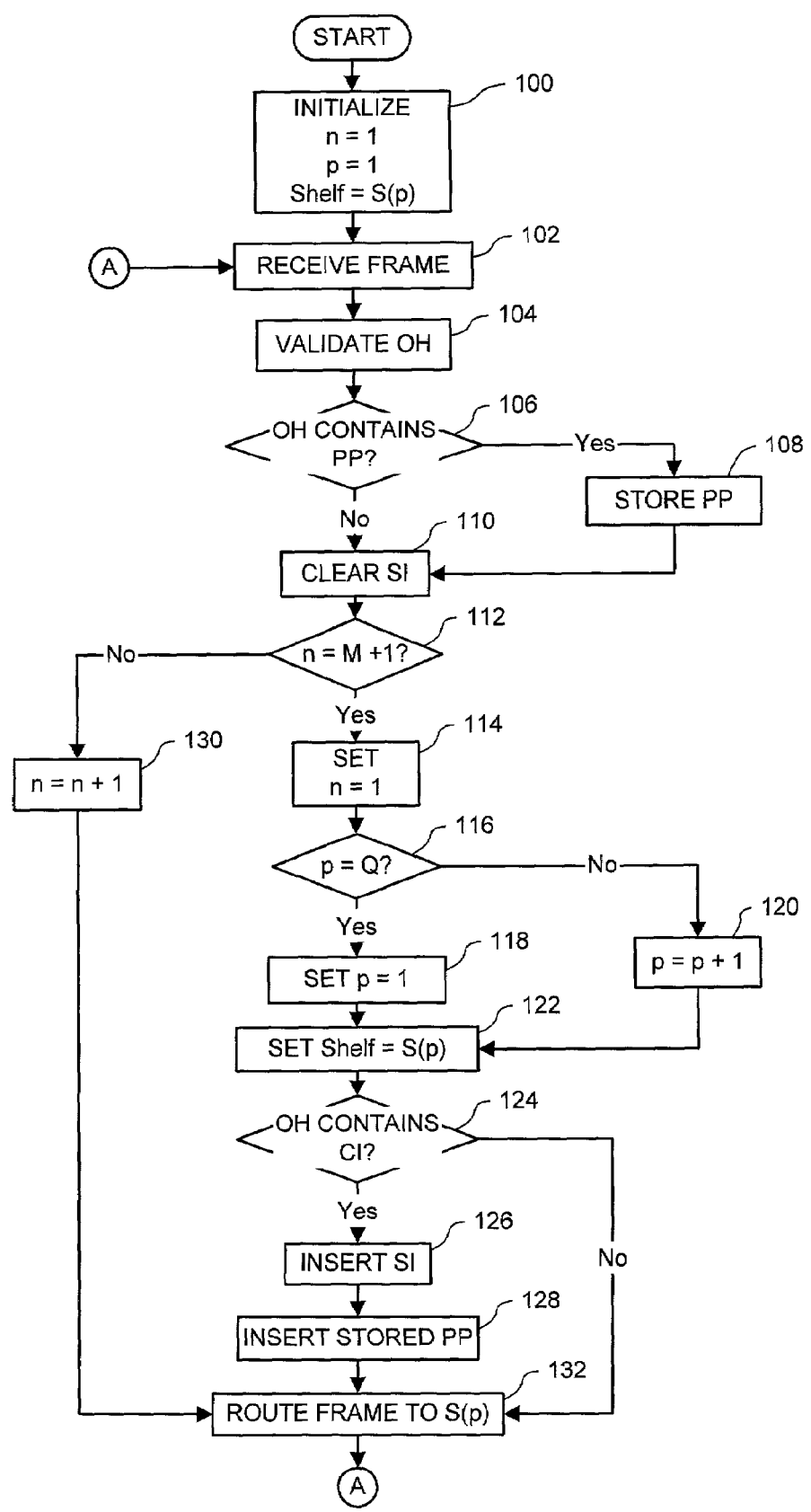
FIG. 3 is a flow chart showing principal steps in a process for splitting a high bandwidth signal in accordance with an embodiment of the present invention.

As shown in FIG. 3, the result of the above processing of each successive frame F(1)–F(192) of the virtual STS-Kc signal 26 is that the input data stream 22 is split into four sub-streams 28–28 that are routed through respective shelves 16 S(1)–S(4) of the switch core 12. Each of the sub-streams 28 are organized as follows:

the first sub-stream 28a contains frames F(1) through F(48), including the two STS-24 signals 24a and 24b, in their original form;

the second sub-stream 28b contains frames F(49) through F(96). Because frame F(49) is the first frame of the STS-96 signal 24c, its payload pointer is stored in memory for future use. Frames F(50)–F(96) are passed through the signal processor 20 without modification.

The third sub-stream 28c contains frames F(97) through F(144). In this case, frame F(97) is part of the STS-96 signal 24c. Consequently, its frame overhead is modified to contain a split indicator (SI), (e.g., binary "01" in the SS field of the frame overhead) and the previously stored payload pointer (PP) of the first frame in the STS-96 signal 24 (in this case frame F(49)). Frames F(98)–F(144) are passed through the signal processor 20 without modification.

The fourth sub-stream 28d contains frames F(145) through F(192). Because frame F(145) is the first frame of the STS-48 signal 24d, its payload pointer is stored in memory for future use. Frames F(146)–F(192) are passed through the signal processor 20 without modification.

Thus constructed, each sub-stream 28 is effectively indistinguishable from a standard SONET/SDH STS-Mc signal (M=48 in this example), and may thus be routed through independent conventional pointer processors. However, the presence of the explicit split indicators, (in this case the leading frame of sub-stream 28c) enables reconstruction of the virtual STS-Kc signal 26, and thus construction of an output data stream equivalent to the input data stream 22, at the output port 8c, as will be described in greater detail below.

As explained above, each of the sub-streams 28 may be pointer processed in a conventional manner by independent pointer processing state machines within each shelf. Because the SS field in the frame overhead is generally unused, the split indicator passes through each pointer processing state machine unchanged, so that signaling is preserved. It will be appreciated that any other location within the frame may be used to store the split indicator, provided that the selected location is passed through each pointer processor state machine unchanged. An advantage of using the SS field is that this location avoids incurring signaling delay or misconnection of the signals.

The term "independent pointer processing state machine" refers to a pointer processing state machine that is independent from other pointer processing state machines, such that stuff indications or pointer values are not passed from one state machine to the other within the time interval between the receipt of the pointers and a corresponding stuff opportunity.

Construction of the Output Data Stream

Figure 4:
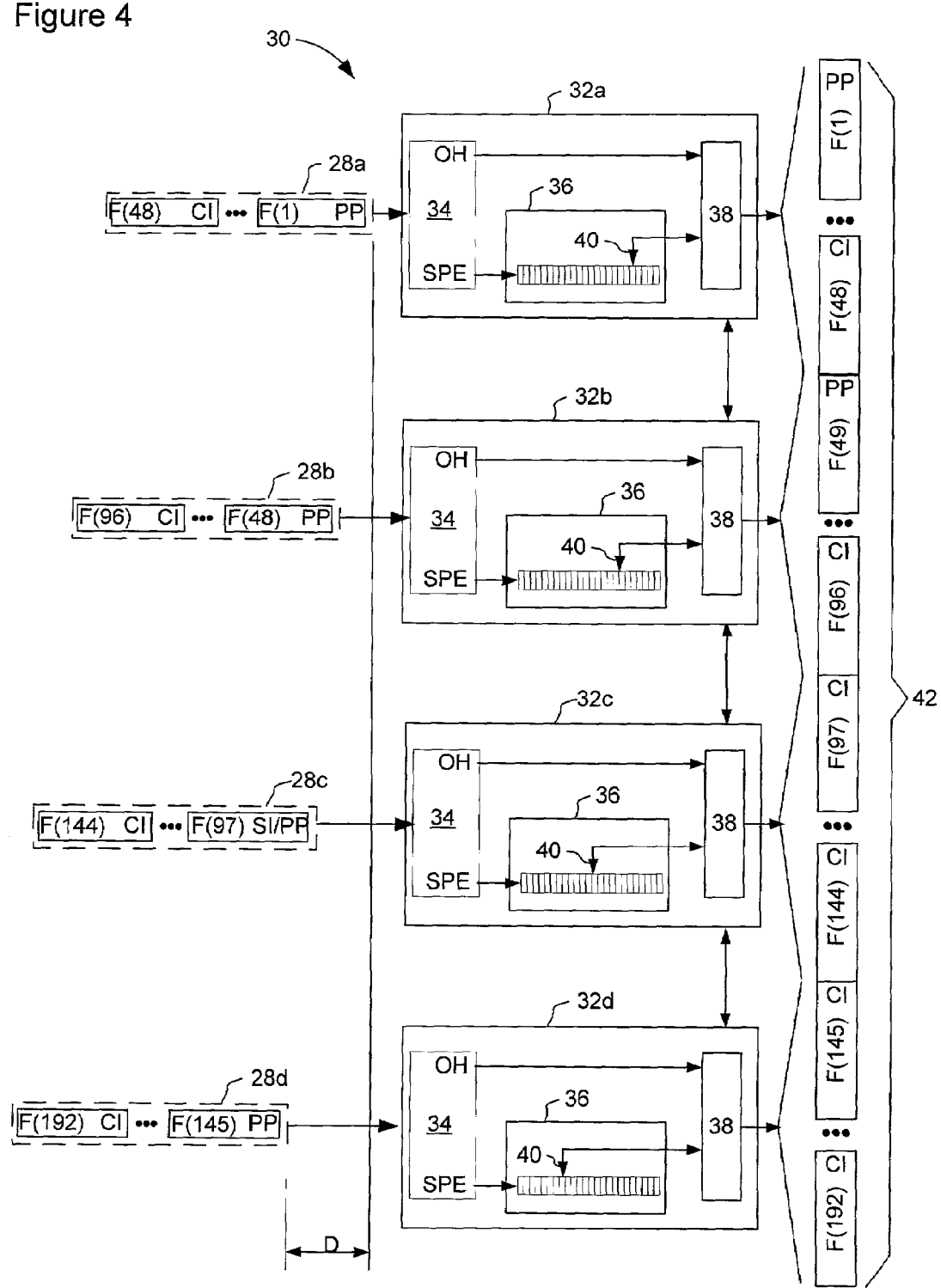
FIG. 4 is a block diagram schematically illustrating principle operations of an output port of the cross-connect of FIG. 1.

FIG. 4 is a block diagram schematically illustrating functional components of a signal recombination circuit 30 operatively connected within the output port 8c. As with the signal processor 20 described above, the signal recombination circuit 30 may be implemented as any suitable combination of hardware and/or software. At higher line rates (e.g. above 2.5 GHz) a hardware-based implementation will be required for satisfactory performance.

As mentioned above, the sub-streams 28a–d are received from respective independent shelves 16a–d. The signal recombination circuit 30 generally comprises a respective pointer processor state machine 32a–d for each of the sub-streams 28a–d. The parallel pointer processor state machines 32 are inter-connected to enable synchronous read operations, and to enable pointer values to be propagated across each of the sub-streams 28. As shown in FIG. 4, each pointer processor state machine 32 generally comprises a framer 34, an alignment buffer 36, and a read processor 38.

The framer 34 operates to pointer process successively received frames in a manner known in the art. In particular, following validation of the frame, the frame overhead is analyzed to identify the first byte of payload data, as well as locations of positive and negative stuffs. Each synchronous payload envelope (SPE) is read into a respective alignment buffer 36. The alignment buffers 36 are preferably first-in-first-out buffers (FIFOs) having an adjustable read pointer 40 to permit compensation for propagation delay differences. As a result, payload alignment across the multiple sub-streams can be accomplished by adjusting a location of the respective read pointer 40 of each involved FIFO. Preferably, each alignment buffer 36 has a memory capacity sufficient to store the number of data bytes received during a period of twice the maximum anticipated difference in propagation delay between the respective sub-streams 28a–d. An additional amount of storage capacity (for example equivalent to a number of bytes received during a period of approximately 2.5 μSec) is preferably provided to compensate for arbitrary alignment of incoming and outgoing frames, jitter between read and write clocks, and dead zone to minimize outgoing pointer adjustments.

The read processors 38 co-operate to construct frames of an output virtual STS-Kc signal 42. The frame phase of the output virtual STS-Kc signal 42 is arbitrary, and will generally be selected to have the same phase as other signals being processed through the output port 8b. Each read processor 38 operates to construct a respective set of M aligned frames. The majority of the overhead of each frame is copied from the overhead of corresponding sub-stream frames received by the pointer processor state machine 32. However, if a received frame contains a payload pointer, and no split indicator, then a valid payload pointer (which may, for example, be determined as described below) is inserted into the frame overhead. Because the payload phase within the reconstructed STS-Kc signal 42 will normally be different from that of the received frame, the payload pointer inserted into the frame overhead will also differ from that of the received frame.

On the other hand, if a received frame contains both a payload pointer and a split indicator, then a concatenation indicator is inserted into the frame overhead, so as to restore the STS-N concatenation of the original serial data stream 22. If desired, the split indicator can also be reset to its default value (e.g., by writing binary "00" to the SS bits of the frame overhead).

In general, data for the output virtual STS-Kc signal 42 is read from each alignment buffer 36, in parallel, and mapped to an STS-Kc SPE (not shown). In order to achieve payload alignment, one of the sub-streams 28 is selected as a reference (nominally referred to as 28(r)), and the remaining sub-streams are designated as slave sub-streams (nominally referred to as 28(s)). The reference sub-stream 28(r) may be arbitrarily selected. However, a sub-stream 28 having a propagation delay in about a middle of the range of propagation delays is preferred. Within the reference pointer processor state machine 32(r), the read operation is controlled such that the read pointer 40 is located at approximately the mid point of the alignment buffer 36. The respective read pointers 40 in each of the slave pointer processor state machines 32(s) are then adjusted to compensate for differences in propagation delay between the respective slave sub-stream 28(s) and the reference sub-stream 28(r). In addition, the read clocks (not shown) in each of the slave pointer processor state machines 32(s) are synchronized with that of the reference pointer processor state machine 32(r) so that each successive payload byte is read substantially simultaneously from each of the alignment buffers 36. Finally, a valid payload pointer, as well as any required stuff indications, are determined by the reference pointer processor state machine 32(r), in a conventional manner. This information is then passed to each of the slave pointer processor state machines 32(s) for insertion in the frame overhead of their respective sets of frames of the output virtual STS-Kc signal 42, as required.

Thus it will be seen that a data stream 22 containing an arbitrary mixture of high and low bandwidth signals 24 is mapped through a cross-connect 2 via multiple parallel shelves 16. High bandwidth signals are split across two or more sub-streams 28, each of which is mapped through a respective shelf 16. The content of each of the sub-streams is used at the output port 8 to generate an output data stream in which the payload data and frame concatenation of the original data stream 22 is preserved.

The embodiment(s) of the invention described above are therefore intended to be exemplary only. The scope of the invention is therefore intended to be limited solely by the scope of the appended claims.

We claim:

1. A method of mapping a data stream through a cross-connect via two or more parallel shelves of a switch core of the cross-connect, wherein each shelf has a respective independent pointer processing state machine, and the data stream comprises either one of Synchronous Optical Network (SONET) and Synchronous Digital Hierarchy (SDH) signals, the method comprising steps of:
   a) receiving the data stream at an input port of the cross-connect;
   b) splitting the received data stream into at least two sub-streams;
   c) modifying at least one sub-stream to emulate a conventional Synchronous Transport System (STS) concatenation with sufficient accuracy to enable successful pointer processing through a shelf;
   d) mapping each of the sub-streams to a selected output port of the cross-connect via a respective shelf; and
   e) constructing an output data stream that is equivalent to the received data stream, at the output port, using content of each of the sub-streams.

2. A method as claimed in claim 1, wherein the data stream comprises an arbitrary mixture of high and low bandwidth signal traffic.

3. A method as claimed in claim 1, wherein the step of modifying at least one sub-stream comprises steps of:
   a) inspecting an overhead of each frame of the data stream to determine whether the overhead contains a payload pointer; and
   b) if the overhead contains a payload pointer, storing the payload pointer.

4. A method as claimed in claim 1, wherein the step of modifying at least one sub-stream comprises a step of assigning a default value to a predetermined set of one or more bits of each frame.

5. A method as claimed in claim 4, wherein the step of assigning a default value comprises a step of writing the default value to the predetermined set of bits.

6. A method as claimed in claim 5, wherein the predetermined set of bits is located within the overhead of each frame.

7. A method as claimed in step 6, wherein the predetermined set of bits comprises SS bits of an H1 byte of the overhead of each frame.

8. A method as claimed in claim 4, wherein the default value is binary "00".

9. A method as claimed in claim 4, further comprising steps of:
   a) determining if a frame is a lead frame of a respective one of the sub-streams;
   b) if the frame is a lead frame, examining the frame overhead to determine whether it contains a concatenation indicator, and
   c) if the lead frame's overhead contains a concatenation indicator:
      replacing the concatenation indicator with a valid payload pointer; and
      inserting a split indicator into the predetermined set of bits of the frame.

10. A method as claimed in claim 9, further comprising a step of:
    a) if the frame is the lead frame of a sub-stream, forwarding the frame to a next, successive, shelf of the cross-connect; and
    b) otherwise, forwarding the frame to the same shelf as the previous frame.

11. A method as claimed in claim 10, wherein the next successive shelf is selected in accordance with a predetermined shelf order sequence.

12. A method as claimed in claim 1, wherein the step of constructing the output data stream comprises, for each sub-stream, steps of:
    a) constructing a respective set of sequential frames of the output data stream;
    b) mapping payload data from the sub-stream, payload aligned with each of the other sub-streams, to the respective set of frames of the output data stream.

13. A method as claimed in claim 12, wherein a phase relationship between a sub-stream and the output data stream is arbitrary.

14. A method as claimed in claim 12, wherein the step of constructing a respective set of sequential frames of the output serial data stream comprises steps of:
    a) copying at least a portion of an overhead of each frame of the respective sub-stream to a corresponding frame of the output data stream;

b) examining each frame of the respective sub-stream to determine whether or not the frame contains a split indicator;

c) if the frame contains a split indicator, inserting a concatenation indicator into the overhead of the corresponding frame of the output data stream; and d) if the frame does not contain a split indicator examining the frame to determine whether or not the frame contains a payload pointer, and if the frame contains a payload pointer, inserting a valid payload pointer into the overhead of the corresponding frame of the output data stream.

15. A method as claimed in claim 12, wherein the step of mapping payload data from the sub-stream comprises steps of:

a) buffering the payload data of the sub-stream; and b) controlling a read operation for reading the buffered payload data, such that corresponding bytes of each sub-stream are read substantially simultaneously.

16. A cross-connect adapted to map a data stream between an input port and an output port via two or more parallel shelves of a switch core of the cross-connect, each shelf having a respective independent pointer processing state machine and the data stream comprising either one of Synchronous Optical Network (SONET) and Synchronous Digital Hierarchy (SDH) signals, the cross-connect comprising;

a) an input port adapted to receive the data stream;

b) a signal processor adapted to split the received data stream into two or more sub-streams, and forward each sub-stream to a respective shelf, and further adapted to modify at least one sub-stream to emulate a conventional Synchronous Transport System (STS) concatenation with sufficient accuracy to enable successful pointer processing through its respective shelf; and c) an output port adapted to construct an output data stream that is equivalent to the received data stream, using content of each of the sub-streams.

17. A cross-connect as claimed in claim 16, wherein the signal processor comprises:

a) means for determining if a frame is a lead frame of a respective one of the sub-streams; and b) means for modifying a lead frame that contains a concatenation indicator to emulate a lead frame of a Synchronous Optical Network (SONET)/Synchronous Digital Hierarchy (SDH) concatenation.

18. A cross-connect as claimed in claim 17, wherein the means for modifying a lead frame comprises:

a) means for replacing the concatenation indicator with a valid payload pointer; and b) means for inserting a split indicator into the frame.

19. A cross-connect as claimed in claim 17, wherein the signal processor further comprises:

a) means for forwarding a lead frame of a sub-stream to a next, successive, shelf of the switch core; and b) means for forwarding any other frame to the same shelf as the previous frame.

20. A cross-connect as claimed in claim 16, wherein, for each shelf of the switch core, the output port comprises:

a) a respective framer adapted to extract payload data and overhead from each successive frame of a respective sub-stream mapped through the shelf;

b) an alignment buffer adapted to align the extracted payload with corresponding extracted payload of at least one other sub-stream; and c) a read processor adapted to construct a respective set of sequential frames of the output serial data stream, and map payload data from the alignment buffer to the respective set of frames of the output data stream.

21. A cross-connect as claimed in claim 20, wherein a phase relationship between the sub-stream and the output data stream is arbitrary.

22. A cross-connect as claimed in claim 20, wherein the alignment buffer comprises:

a) an adjustable read pointer; and b) means for controlling the read pointer to compensate for at least a difference between the propagation delay of the respective sub-stream and that of at least one other sub-stream;

whereby a timing of a read operation for reading buffered payload data from the alignment buffer is synchronized with the a corresponding read operation of the at least one other sub-stream.

23. A cross-connect as claimed in claim 20, wherein the read processor is adapted to:

a) copy at least a portion of the extracted overhead of each frame of the sub-stream to a corresponding frame of the output data stream;

b) insert a concatenation indicator into the overhead of the corresponding frame of the output data stream, if the frame contains a split indicator; and c) insert a valid payload pointer into the overhead of the corresponding frame of the output data stream if the frame contains a payload pointer and does not contain a split indicator.

* * * * *